US007685315B2

(12) United States Patent
Pessi et al.

(10) Patent No.: US 7,685,315 B2
(45) Date of Patent: Mar. 23, 2010

(54) SYSTEM AND METHOD FOR CONVEYING TERMINAL CAPABILITY AND USER PREFERENCES-DEPENDENT CONTENT CHARACTERISTICS FOR CONTENT ADAPTATION

(75) Inventors: Pekka Pessi, Helsinki (FI); Stephane Coulombe, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/281,872

(22) Filed: Oct. 28, 2002

(65) Prior Publication Data

US 2004/0083291 A1 Apr. 29, 2004

(51) Int. Cl.
*G06F 15/16* (2006.01)
(52) U.S. Cl. .................................... 709/246
(58) Field of Classification Search ............. 709/225, 709/203, 217, 220, 246, 227, 219
See application file for complete search history.

(56) References Cited

U.S. PATENT DOCUMENTS

| 6,243,392 | B1 | 6/2001 | Uemura et al. | |
|---|---|---|---|---|
| 6,564,261 | B1 * | 5/2003 | Gudjonsson et al. | 709/227 |
| 6,625,141 | B1 * | 9/2003 | Glitho et al. | 370/352 |
| 6,961,754 | B2 | 11/2005 | Christopoulos et al. | |
| 7,035,923 | B1 * | 4/2006 | Yoakum et al. | 709/224 |
| 7,191,233 | B2 * | 3/2007 | Miller | 709/223 |
| 7,257,201 | B2 * | 8/2007 | Singh et al. | 709/227 |
| 7,603,411 | B1 * | 10/2009 | Davies et al. | 709/204 |
| 2002/0065894 | A1 * | 5/2002 | Dalal et al. | 709/206 |
| 2002/0073238 | A1 | 6/2002 | Doron | |
| 2002/0129093 | A1 * | 9/2002 | Donovan et al. | 709/203 |
| 2003/0014668 | A1 * | 1/2003 | Faccin et al. | 713/201 |
| 2003/0041101 | A1 * | 2/2003 | Hansche et al. | 709/203 |
| 2003/0191762 | A1 | 10/2003 | Kalliokulju et al. | |
| 2003/0217099 | A1 * | 11/2003 | Bobde et al. | 709/202 |
| 2003/0236892 | A1 * | 12/2003 | Coulombe | 709/228 |
| 2004/0003117 | A1 * | 1/2004 | McCoy et al. | 709/246 |
| 2004/0045030 | A1 * | 3/2004 | Reynolds et al. | 725/110 |
| 2004/0059781 | A1 * | 3/2004 | Yoakum et al. | 709/204 |
| 2004/0196966 | A1 * | 10/2004 | Bushnell | 379/88.19 |

(Continued)

FOREIGN PATENT DOCUMENTS

WO WO 02/15625 2/2002

(Continued)

OTHER PUBLICATIONS

CC/PP exchange protocol based on HTTP Extension Framework, W3C Note Jun. 24, 1999 Reynolds et al. http://www.w3.org/1999/06/NOTE-CCPPexchange-19990624.*

(Continued)

*Primary Examiner*—Benjamin R Bruckart
(74) *Attorney, Agent, or Firm*—Hollingsworth & Funk, LLC

(57) ABSTRACT

A system and method for conveying content-specific characteristics related to terminal capabilities and user preferences, and adapting content for particular terminals in response to the conveyed information. A content type or other message characteristic that is recognizable by the terminal is identified, as are operational confines of the terminal by which the content type is to comply. The content type is associated with the operational confines of the terminal. The content type and associated operational confines are provided to the network server for use by the network server in delivering messages to the terminal as dictated by the operational confines.

32 Claims, 7 Drawing Sheets

U.S. PATENT DOCUMENTS

2004/0254905 A1* 12/2004 Tiku .......................... 706/55

FOREIGN PATENT DOCUMENTS

WO     WO 02/056563     7/2002

OTHER PUBLICATIONS

Request for Consideration 2543, Handley et al, SIP: Session Intitiation Protocol. Mar. 1999. http://www.faqs.org/rfcs/rfc2643.html.*

WAP Specification Information Note WAP-174_100-UAPROF, Version Jun. 21, 2000 A Wireless Application Protocol Specification Information Note for: User Agent Profile Specification WAG-174-UAPROF Version Nov. 10, 1999, pp. 1-39.

G. Klyne, *A Syntax for Describing Media Feature Sets*, Standard Tracks, Mar. 1999, pp. 1-37.

H. Schulzrinne and J. Rosenberg, *Session Initiation Protocol (SIP) Caller Preferneces and Callee Capabilities*, Internet Engineering Task Force, Internet Draft. Jul. 1, 2002—Expires Jan. 2003, pp. 1-25.

Franklin Reynolds, Johan Hjelm, Spencer Dawkins, and Sandeep Singhal, *Composite Capability/Preference Profiles (CC/PP): A user side framework for content negotiation*, W3C Note Jul. 27, 1999, pp. 1-15. http://www.w3.org/TR/NOTE-CCPP.

N. Freed and N. Borenstein, *Multipurpose Internet Mail Extensions (MIME)Part Two: Media Types*, Nov. 1996, pp. 1-44.

K. Holtman and A. Mutz, *Transparent Content Negotiation in HTTP*, Mar. 1998, pp. 1-58.

H. Khartabil, *Congestion safety and Content Indirection*, Jul. 25, 2002, pp. 1-15. http://www.potaroo.net/ietf/xld-ids/draft-khartabil-sip-congestionsafe-ci-00.txt.

J. Rosenberg, D. Willis, R. Sparks, B. Campbell, H. Schulzrinne, J. Lennox, C. Huitema, B. Aboba, D. Gurle and D. Oran, *SIP Extensions for Instant Messaging*, Internet Engineering Task Force Internet-Draft. Jul. 18, 2001—Expires Jan. 16, 2002, pp. 1-23.

R. Fielding, J. Gettys, J. Mogul, H. Frystyk, L. Masinter, P. Leach and T. Berners-Lee, *Hypertext Transfer Protocol—HTTP/1.1*, Category: Standards Track, Jun. 1999, pp. 1-176.

Kutscher et al., "Session Description and Capability Negotiation", Network Working Group, Internet-Draft, Nov. 21, 2001.

* cited by examiner

800 → ( &   ( & (encoding="identity") (length<=32768) )

802A → ( |   ( & (type="image/jpeg") (media-pix-x<=640)

802B → (media-pix-y<=480) (length<16384)) ; q=0.9

804A → ( & (type="image/gif") (media-pix-x<=160)

804B → (media-pix-y<=120) (length<16384)) ; q=0.8   ))

*FIG. 8A*

810 → Accept-Encoding: identity; length=max+32768

812A → Accept: image/jpeg; q=.9; media-pix-x=max+640; media-pix-y=max+480; length=max+16384, 812B → image/gif, q=.8; media-pix-x=max+160; media-pix-y=max+120; length=max-16384

*FIG. 8B*

SYSTEM AND METHOD FOR CONVEYING TERMINAL CAPABILITY AND USER PREFERENCES-DEPENDENT CONTENT CHARACTERISTICS FOR CONTENT ADAPTATION

FIELD OF THE INVENTION

This invention relates in general to communications, and more particularly to a system and method for providing content-specific characteristics related to terminal capabilities and user preferences, which allows content to be adapted for particular terminals in response to the terminal-specific information.

BACKGROUND OF THE INVENTION

Interoperability is of paramount importance in messaging. Senders of messages expect that messages will reach their destination and will be handled properly by the recipient's terminal, regardless of the type of terminal used by the recipient. However, emerging mobile terminals have made this requirement more challenging, due to the wide diversity of terminal characteristics such as display size and resolution, available memory, formats that are supported, etc. Furthermore, the network may also imposes limitations, such as a maximum size over User Data Protocol (UDP). A similar challenge exists in connection with information browsing, such that content is delivered and usable in an appropriate manner for the wide variety of current and future landline and mobile terminals.

Media content adaptation proxies could play an important role in maintaining interoperability and increasing user experience in many domains of applications such as messaging, browsing, etc. These proxies, commonly referred as transcoding proxies, transform media content to make it suitable for the destination terminal. For instance, one such transformation includes format conversion, e.g. Portable Network Graphics (PNG) to Graphics Interchange Format (GIF). In browsing situations, the origin server can also manage such adaptation to match the recipient's terminal capabilities.

However, in order to adapt the content to match the terminal characteristics, those characteristics must be known to the transcoding agent. Existing methodologies do not provide sufficient detail about the terminal characteristics or the user's preferences to adequately conform to the particular terminal. For example, the Session Initiation Protocol (SIP) Extensions for Instant Messaging and SIP Extensions for Presence does not provide any mechanism to discover the recipient's terminal capabilities to verify if the body of a SIP MESSAGE or NOTIFY method is supported by the recipient's terminal. A message is typically generated and sent without consideration of all the terminal capabilities. Nevertheless, the message originator usually expects that the message will reach its destination, and will be handled properly by the recipient's terminal.

This situation is not a significant problem for the short text messages that are mostly in use today. But the situation may become increasingly problematic as messages become composed of rich media components such as images, audio and video clips, etc. The proliferation of differing mobile terminals types and characteristics will also make this requirement more challenging. For instance, the received message may be too large for the recipient's terminal memory, or a mobile terminal may not support certain media types, or may support them only under certain conditions.

Thus, generalized terminal capabilities for the multitude of different terminal types simply does not provide enough information for today's content-rich communication. Rather than limiting the options to users of landline and mobile terminals, it would be desirable to provide a suitable manner of providing terminal characteristics and/or user preferences to a framework on which content can be responsively adapted. The present invention fulfills these and other needs, and offers other advantages over the prior art approaches.

SUMMARY OF THE INVENTION

Generally, the present invention provides a system and method for providing specific terminal capabilities and configured preferences for use in a network environment.

In accordance with one embodiment of the invention, a method is provided for procuring operational characteristics of a terminal at a network server for use by the network server in delivering terminal-compliant messages to the terminal. These operational characteristics include, for example, technology-dependent characteristics of the terminal as well as user preferences configured on the terminal. A content type that is recognizable by the terminal is specified, as are operational confines of the terminal by which the content type is to comply. The content type is associated with the operational confines of the terminal. The content type and associated operational confines are provided to the network server for use in delivering messages to the terminal as dictated by the operational confines.

In accordance with a more particular embodiment of such a method, specifying a content type includes specifying a content type in a Session Initiation Protocol (SIP) header, and specifying operational confines of the terminal includes specifying the operational confines in an extended SIP header field. The content type is associated with the operational confines by correlating the extended SIP header field with the SIP header. The content type and associated operational confines are provided to the network server by transmitting a message including the SIP header and extended SIP header field via SIP.

In accordance with another particular embodiment of such a method, specifying a content type includes specifying a content type in a first Caller Preferences and Callee Capabilities (CPCC) feature tag, and specifying operational confines of the terminal includes specifying the operational confines in a second CPCC feature tag. The content type is associated with the operational confines by correlating the second CPCC feature tag with the first CPCC feature tag. Providing the content type and associated operational confines to the network server includes transmitting a message including the correlated first and second feature tags to the network server.

In accordance with still more particular embodiments, a number of different operational confines may be provided for each of the different content types. For example, the content types may include an image type, video type, text type, audio type, etc. The operational confines associated with the terminal may include, for example, body size of the message itself, resolution of images or video, data size of the accepted content, etc.

In accordance with another embodiment of the invention, a method is provided for procuring operational characteristics of a terminal at a network server for use in delivering terminal-compliant messages to the terminal. This embodiment includes specifying at least one content type acceptable by the terminal, by way of an accept-type header field of a registration or subscription message. Rules pertaining to the content type are also specified, via an extension to the accept-type header field. The rules establish terminal-specific conditions in which the content type will be accepted at the terminal. The registration or subscription message is sent to the network server for use in delivering the terminal-compliant messages to the terminal as mandated by the rules.

In accordance with another embodiment, a method is provided for procuring operational characteristics of a terminal at a network server for use by the network server in delivering terminal-compliant messages to the terminal. This embodiment includes specifying at least one content type acceptable by the terminal using Caller Preferences and Callee Capabilities (CPCC) in connection with a registration or subscription message. Rules pertaining to the content type are specified by way of media feature tags, where the rules establish terminal-specific conditions in which the content type will be accepted at the terminal. The registration or subscription message is sent, with the rules expressed by way of the CPCC, to the network server for use in delivering the terminal-compliant messages to the terminal as mandated by the rules.

In accordance with another embodiment of the invention, a method is provided for preparing message content for use on a terminal. The method includes providing terminal-related information to a network element involved in communications with the terminal. The terminal-related information includes content types accepted by the terminal, and operational limits of the terminal by which the content types are to comply. These operational limits include, for example, technology-dependent characteristics of the terminal as well as user preferences configured on the terminal. Messages targeted for the terminal are received at the network element, and the content associated with the received message is adapted for use on the terminal, based on the terminal-related information.

In accordance with another embodiment of the invention, a system for delivering digital content over a network is provided. The system includes a network server system coupled to receive messages targeted for terminals via the network. The system further includes a plurality of terminals coupled to the network, where each of the terminals is configured to provide its corresponding terminal-dependent information to the network server system via Session Initiation Protocol (SIP) headers. The terminal-dependent information may include various content types accepted by the terminal, and operational limits specific to the terminal by which the content types are to comply. The network server system is configured to receive the SIP headers, and to adapt the content associated with the received messages for each of the terminals based on at least the operational limits specific to the terminal.

In accordance with another embodiment of the invention, a system for delivering digital content over a network is provided. The system includes a network server system coupled to receive messages targeted for terminals via the network. The system further includes a plurality of terminals coupled to the network, where each of the terminals is configured to provide its corresponding terminal-dependent information to the network server system via Caller Preferences and Callee Capabilities (CPCC) feature tags. The terminal-dependent information includes content types accepted by the terminal, as well as operational limits specific to the terminal by which the content types are to comply. The network server system is configured to receive the CPCC feature tags, and to adapt the content associated with the received messages for each of the terminals based on at least the operational limits specific to the terminal. In more particular embodiments, some terminal capabilities may implement CPCC while others may implement SIP header extensions. Thus, a given terminal may use either methodology at any given time.

BRIEF DESCRIPTION OF THE DRAWINGS

The invention is described in connection with the embodiments illustrated in the following diagrams.

FIGS. 8A and 8B illustrate representative examples of capability exchange using the CPCC and header extension methodologies in accordance with the present invention;

DETAILED DESCRIPTION OF THE INVENTION

Figure 1:
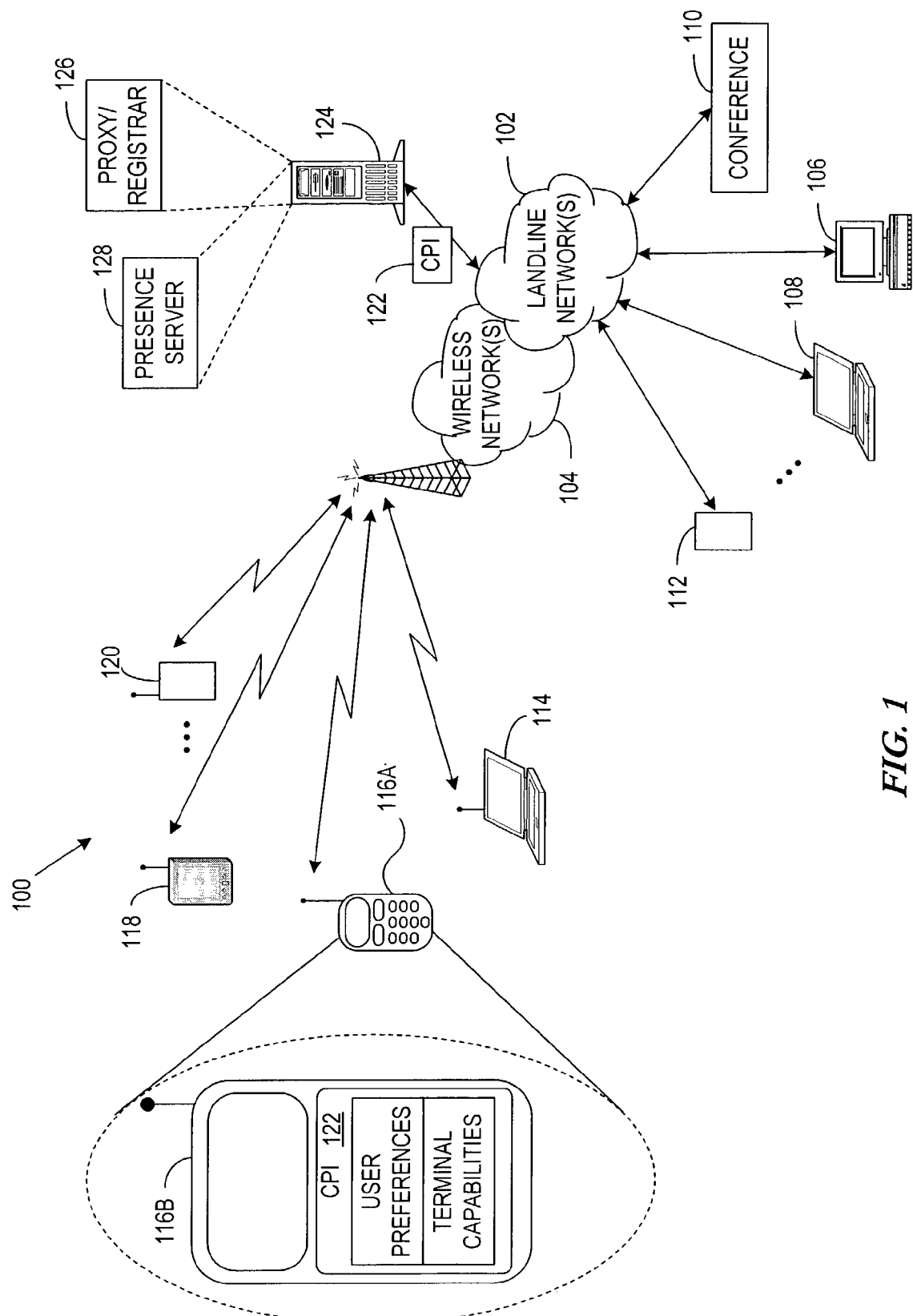
FIG. 1 illustrates a representative system environment in which the principles of the present invention may be employed.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of the exemplary embodiment, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides a system and method for providing content-specific characteristics related to terminal capabilities and user preferences. For purposes of simplicity, references to terminal capabilities/user preferences as used herein generally refer to message and/or content characteristics that are related to the technical capabilities of the terminal and/or user preferences configured on the terminal. By properly conveying this terminal-related information, including user-defined preferences and/or technological capabilities of the terminal, communicated data can be modified such that it properly conforms to the particular characteristics of terminals receiving the data. The terminal-related information is provided to network elements such as registrars, proxies, presence servers, or other network elements that are involved with communications with the terminal. By conveying capability information in accordance with the invention, messages including content or other data that is targeted for the terminal is received at the network element, and content/data adaptation can be performed based on the terminal-related information so that the content conforms to the particular user preferences and capabilities of the terminal. Once properly adapted, the message and associated data may be transmitted to the terminal, in the format preferred and/or technologically recognizable at the terminal. In one embodiment of the invention, the terminal-related information is provided to the network element via existing communication protocols, enhanced through the use of extended headers and/or new feature tags, which provide for accurate content rendering and consistent usability while maintaining backward compatibility with existing protocols.

While the present invention is applicable in various environments using a variety of different communication protocols, the present invention is particularly useful in network environments where browsing, or terminal registration or subscription is implemented, and content is ultimately delivered to the terminal. Such environments include, but are not limited to, web browsing, teleconferencing, instant messaging (IM), presence awareness, etc. For purposes of illustration and not of limitation, the present invention is described in terms of networking environments where HTTP, SIP, and/or analogous protocols may be employed.

The Hypertext Transfer Protocol (HTTP) is an application protocol for exchanging files on the World Wide Web. Web servers generally include an HTTP daemon, which is a program designed to monitor for HTTP requests and handle them upon their arrival. Web browsers operating on landline or mobile terminals operate as HTTP clients, sending requests to servers. When the user enters file requests via the browser by either submitting a Uniform Resource Locator (URL) or selecting a hyperlink, the browser builds an HTTP request and sends it to the Internet Protocol (IP) address identified by the URL. The HTTP daemon in the destination server receives the request, and returns the requested file, which may include any one or more of text, voice, images, audio, video, etc.

However, the terminals from which browsing and file requests originate take on a variety of different characteristics relative to one another. For example, a workstation display device is large and may exhibit high resolution characteristics. A mobile terminal, on the other hand, is generally made for portability and mobility, and are often small, hand-held devices. The display characteristics of such a small, hand-held device may differ significantly from their workstation or desktop counterparts, in size, resolution capabilities, accepted content formats, etc. Further, technological advances in wireless technologies have resulted in a proliferation of different types and sizes wireless devices having different display characteristics, audio characteristics, etc. The files received via servers may therefore be entirely compatible with one type/size of terminal, but unsuitable for others. As described more fully below, the present invention addresses these problems.

Content may be provided to terminal users in a variety of other contexts. One example is in the context of communication sessions between two or more users, such as in the case of teleconferencing, instant messaging (IM), and other presence-awareness applications. In these and other situations where "sessions" (i.e., exchanges of data) are established, messages are sent either unidirectionally, or more typically bidirectionally, between multiple terminals involved in the session(s). These messages, like files returned in the HTTP example described above, often include various forms of content including text, voice, images, audio, video, etc. The characteristics of the terminal receiving such content is again relevant, as the adequacy of presentation of such content is highly dependent on the terminal's capabilities and/or the preferences configured by the user.

More particularly, IM is the exchange of content between a set of participants in real time. The concept of the user's "presence" often comes into play in IM situations, as a user must be located before a session can be established with the originating user. Other situations, such as teleconferencing, Internet telephony, location-based services, and other applications also require knowledge of a user's "presence." Presence is generally the subscription to and notification of changes in the communications state of a user. This communications state includes the set of communications means, communications address, and status of the user. A presence protocol is one that provides such a service over a network.

One embodiment of the present invention utilizes the Session Initiation Protocol (SIP). SIP is an application-layer signaling protocol for creating, modifying, and terminating sessions with one or more participants. It can be used in applications such as Internet conferencing, telephony, presence, events notification, instant messaging, and the like. SIP enables network endpoints or "user agents" to discover one another and to agree on a session characterization. In order to locate other users, SIP utilizes an infrastructure of network proxy servers to which users can send registrations, invitations to sessions, and other requests via their terminals. SIP supports various aspects of establishing and terminating sessions, such as user availability, session setup such as ringing, session management, and some limited terminal capabilities.

SIP also enables Instant Messaging outside of sessions using, for example, SIP extensions for Instant Messaging, where the message is sent using a SIP signaling protocol. A SIP MESSAGE is sent, which includes the payload of the message, and the sender receives a confirmation as to whether the message was delivered or not. In such a case, there is no explicit association between messages, and each message stands on its own. This is contrasted with session-based IM, where there is an explicit conversation with a beginning and an end. As is described more fully below, this non-session-based SIP model is particularly significant in connection with the present invention.

An Instant Message sender does not know, and likely does not want to know, about a recipient's terminal capabilities when the sender transmits a message. Existing protocols and methodologies do not present the content-specific characteristics related to the terminal capabilities or user preferences configured on the terminal, and messages directed to such a terminal may not, therefore, be properly suited for that terminal. The present invention addresses this issue, by providing specific terminal capabilities and user preferences to the relevant servers, while allowing the underlying protocol such as HTTP or SIP to be employed.

FIG. 1 illustrates a representative system environment 100 in which the principles of the present invention may be employed. The representative system environment 100 illustrates a networked environment including, for example, both landline 102 and wireless 104 networks. Landline network(s) 102 may include a Global Area Network (GAN) such as the Internet, one or more Wide Area Networks (WAN), Local Area Networks (LAN), and the like. Any computing device or other terminal may be associated with a session in accordance with the present invention, desktop computers 106 or workstations, laptop or other portable computers 108, conferencing systems 110, or any other similar computing device capable of communicating via the network 102, as represented by generic device 112.

Sessions may be established between terminals coupled to the wireless network(s) 104, or between terminals coupled to the wireless network 104 and terminals coupled to the landline network 102. The wireless network 104 may represent any one or more known or future wireless networking technologies, such as the Global System for Mobile Communications (GSM), Universal Mobile Telecommunications System (UMTS), Personal Communications Service (PCS), Time Division Multiple Access (TDMA), Code Division Multiple Access (CDMA), Wideband CDMA (WCDMA), or other mobile network transmission technology. Any computing device or other terminal coupled to the wireless network(s) 104 may be associated with a session, such as laptop or other portable computers 114, mobile phones 116A and other mobile communicators, Personal Digital Assistants (PDA) 118, or any other similar terminal capable of communicating via the wireless network 104, as represented by generic device 120. Other wireless communications means may also couple the various terminals, such as short-range wireless technologies.

Wireless terminal 116A, also shown as terminal 116B, may have different content presentation capabilities and user configurations than one or more of the other representative terminals illustrated in FIG. 1. Associated with the terminal 116B is its Capabilities and user's Preferences Information (CPI) 122, which includes information such as user preferences and the specific terminal capabilities of the terminal 116B. In accordance with the present invention, this CPI 122 is provided to a relevant network element 124, such as a proxy or registrar 126, presence server 128, etc. When another terminal, e.g. desktop computer 106, wants to send a message to wireless terminal 116B, the message is routed to the appropriate network element 124 that has access to the CPI 122 of the terminal 116B. Other servers, such as location servers (not shown), may be called upon to locate the target terminal 116B. In accordance with the present invention, content associated with such a message is adapted at the network element 124 using the CPI 122 associated with the target terminal 116B. The resulting, adapted message can then be transmitted from the network element 124 to the target terminal 116B in a format adapted to the preferences and/or terminal capabilities of the terminal 116B.

In one embodiment of the invention, the problem of interoperability between terminals is addressed in the context of HTTP/SIP content, which is conformed to the recipient's terminal capability and characteristics. To accomplish this, capability information is conveyed in accordance with the invention. Once properly conveyed, the message can be adapted for use on the particular terminal. A number of representative examples in which such content adaptation may be utilized are illustrated below.

Figure 2:
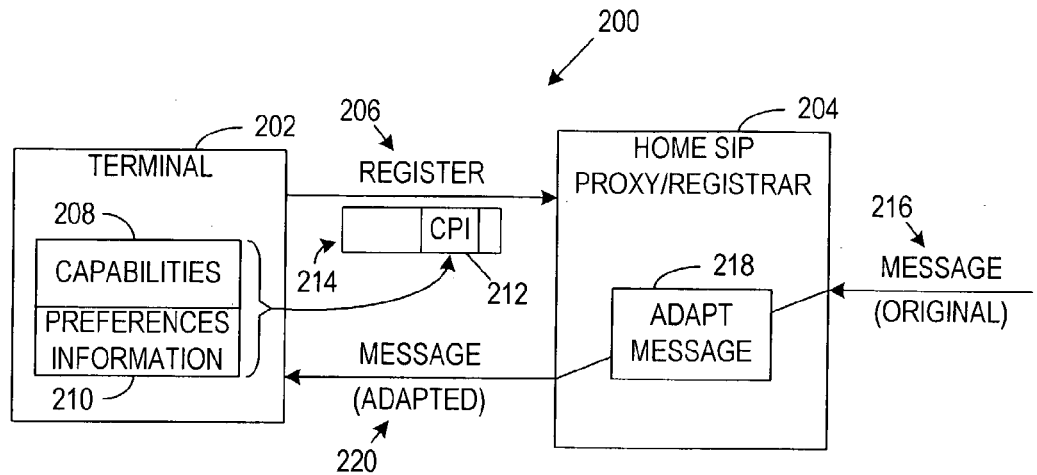
FIG. 2 is a block diagram of a message adaptation framework in accordance with one embodiment of the present invention.

FIG. 2 is a block diagram of a message adaptation framework 200 in accordance with one embodiment of the present invention. In this illustrated embodiment, the terminal 202 registers to its SIP registrar 204. Registration is an operation in SIP that allows a user that may be a potential recipient of a message to register a contact address of the terminal. Upon initialization, or at other times, the user's terminal sends REGISTER messages 206 to the user's home SIP proxy/registrar 204. This message(s) 206 associates the user's SIP URI with the terminal to which the user is currently using. The registrar 204 creates this "binding" by storing the association with a registration database, where it can be used by the proxy in that domain. In the illustrated example, the registrar 204 is co-located with the proxy for that domain.

In accordance with one embodiment of the invention, the terminal 202 provides its Capabilities 208 and the user's Preferences Information 210, collectively referred to as the CPI 212 as part of the registration message, depicted by message 214. The registrar 204 stores the received CPI 212, along with the usual registration data such as the contact address. It is noted that current registrars 204 already perform the operation of storing registration data, and thus additionally storing the CPI 212 is a relatively insignificant additional responsibility for existing registrars 204.

When a SIP message 216 arrives to the recipient's home SIP proxy 204, the SIP proxy 204 uses the registration data gathered by the SIP registrar 204 to learn about the present contact address along with the associated preferences 210 and terminal capabilities 208. The messages 216 may represent, for example, Instant Messages (e.g., MESSAGE method), Notifications (NOTIFY method) in "presence" situations, or any other request messages that include message bodies that the proxy can adapt. The SIP proxy 204 then adapts the message as shown by message adaptation module 218. The message 216 is adapted to meet the terminal's capabilities 208 and/or user's preferences 210 using the stored CPI 212, resulting in an adapted message 220. Alternatively, the proxy 204 may request another server (not shown) to perform the message adaptation. In some embodiments, the adaptation process may lead to the use of content indirection techniques if the resulting message would be too large for the terminal at an acceptable quality.

Figure 3:
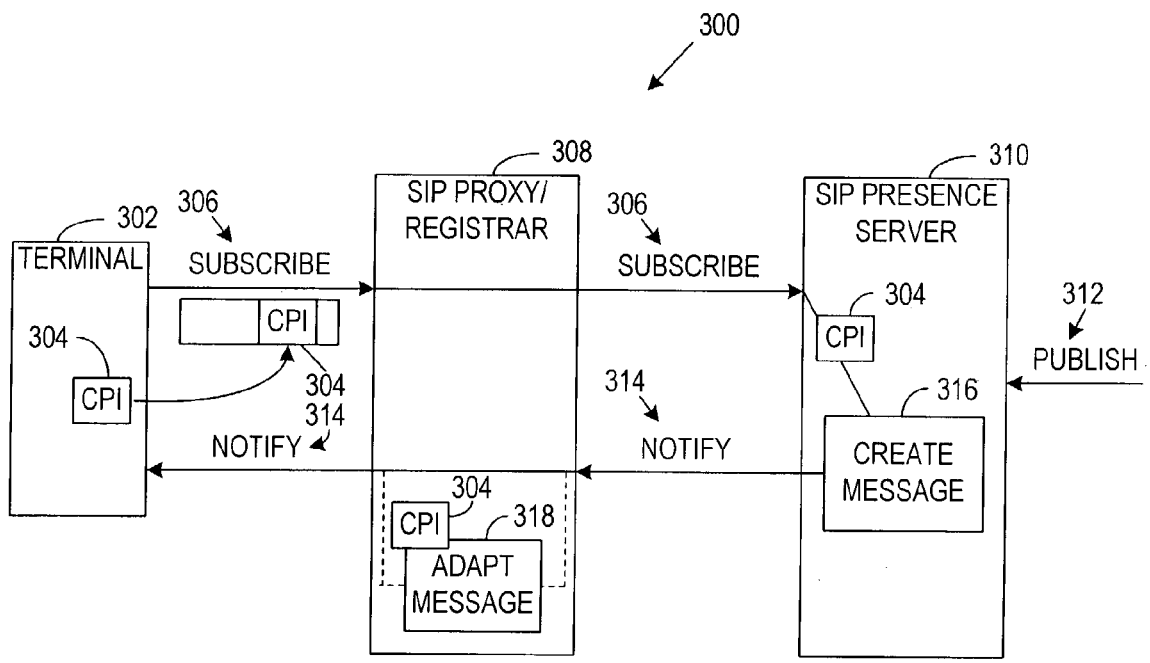
FIG. 3 is a block diagram of one embodiment of a message adaptation framework in the case of a presence application.

FIG. 3 is a block diagram of one embodiment of a message adaptation framework 300 in the case of a presence application. In the illustrated embodiment, the terminal 302 includes CPI 304 as in the previous example. A SUBSCRIBE request 306 is provided from a watcher application in the terminal 302 to the SIP proxy 308. The SUBSCRIBE request 306 is used to express the terminal 302 user's interest in the target presentity's presence information, and thus identifies the target presentity in the request URI. The proxy 308 forwards the SUBSCRIBE request 306 to the SIP presence server 310. In the case of a presence application, a notification message can be adapted in the recipient's SIP proxy 308, similar to that described in connection with FIG. 2.

However, it may be beneficial if the presence server 310 generates appropriate content in the first place and sends it. To enable that, the terminal CPI 304 can also be conveyed to the presence server 310 during the subscription request 306 using the same mechanisms as described in connection with FIG. 2. More particularly, the CPI 304 is sent along with the SUBSCRIBE request 306. Upon receipt of a PUBLISH message 312, the presence server 310 will then create notifications 314 via the message creation module 316 using the CPI 304. In such a case, a NOTIFY message 314 is sent by the presence server 310 to the proxy 308, and then forwarded to the terminal 302 in order to propagate the presence information of the target presentity. The NOTIFY message 314 thus informs the watcher application at the terminal 302 when the presence information of the presentity to which it has subscriptions has been initiated or has subsequently changed. Thus, in this embodiment, the CPI 304 is used at the SIP presence server 310 to create the notification message in a format, size, etc. that corresponds to the CPI 304 of the terminal 302, and the proxy 308 merely forwards the adapted notification message 314 to the terminal 302. In another embodiment, the SIP proxy 308 may serve as a backup in the event that the notification message 314 does not meet the recipient's CPI 304 requirements, in which case the notification message 314 will be adapted via the adaptation module 318 using the CPI 304.

Content indirection generally refers to situations where some portion of the message content is stored in an intermediate server while only an address, such as a URI, is forwarded to the recipient. This can help reduce the overall message size. The adaptation server can decide to use content indirection if it can determine from the recipient's preferences that the recipient is unwilling to directly receive the message contents. The adaptation server can also decide to use content indirection if the recipient's preferences are not known, or if there are multiple user agents possibly receiving the message. Further, the adaptation process may lead to the usage of content indirection techniques if the resulting message would be too large for the terminal at an acceptable quality. In any of these or other situations, content indirection may be used.

Figure 4:
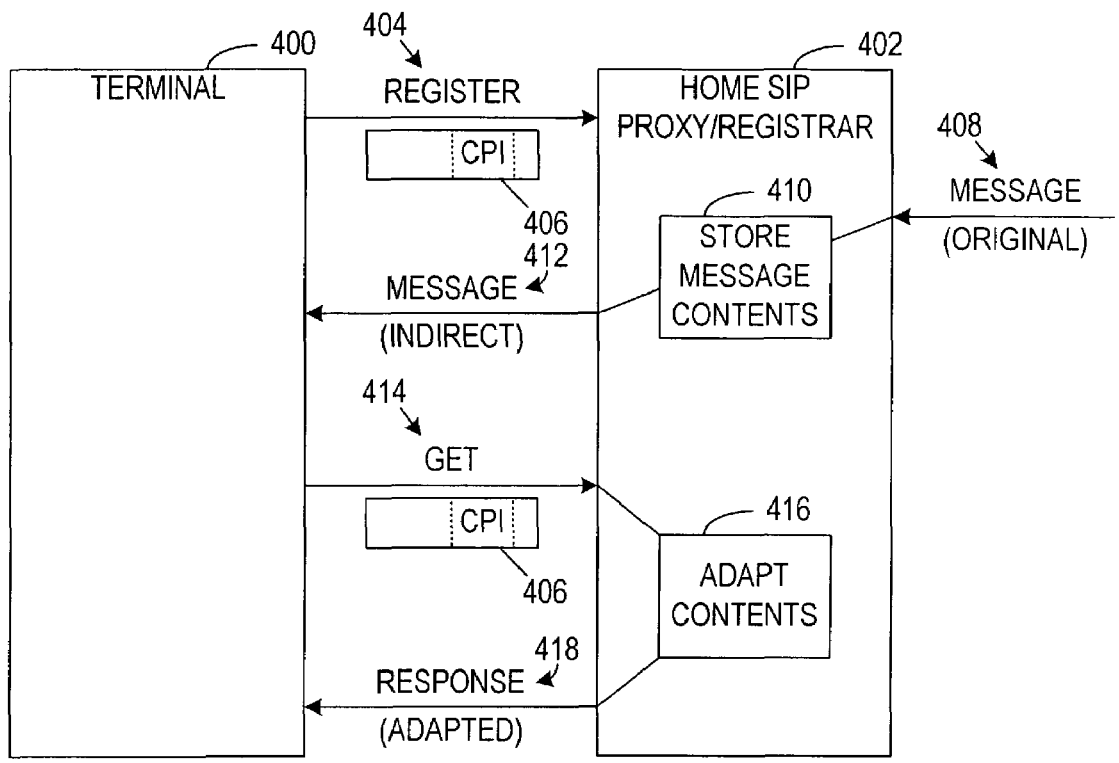
FIG. 4 is a block diagram of one embodiment of a message adaptation framework in which content indirection is employed.

An example of such a process is illustrated in FIG. 4. In this example, the terminal 400 registers to its SIP proxy/registrar 402, via the REGISTER message 404. In some cases the CPI 406 may be sent at this time, such as in the case where the user preferences associated with the CPI 406 indicates that the recipient is not capable of or willing to directly receive the message contents. In other cases, the CPI 406 may not be presented contemporaneously with the REGISTER (or other) message 404. In any event, the SIP registrar 402 stores the registration data. At some time, the SIP proxy 402 (which is co-located with the SIP registrar in this example) receives a new message 408. The proxy 402 decides that it is not able to perform content adaptation for reasons such as those previously identified, or possibly the proxy 402 determines that the adapted contents cannot be sent using SIP. In such cases, the message contents are stored as shown at block 410, and a link to the contents is sent to the recipient's terminal(s) via the "indirect" message 412. Along with this message 412, the need for CPI may be indicated, such as if CPI has not yet been received at the proxy 402.

When the terminal 400 user decides to obtain the message contents, a request, such as an HTTP GET request 414, is sent to the proxy 402. Along with this request, the CPI 406 may be sent, particularly where the CPI has not yet been provided to the proxy 402. The server 402 then adapts the contents in accordance with the CPI as shown at content adaptation module 416. The adapted contents are provided in the response 418 to the GET request 414. The adaptation can be combined with content indirection. For example, if a message 408 were to include an audio clip, an image, and a Synchronized Multimedia Integration Language (SMIL) description, the audio clip and image can be stored in the server 402, and the SMIL description would be adapted to include only the URLs to the clip and image. All or a portion of the contents of the message may optionally be stored in a server different from the SIP proxy/registrar 402. Further, rather than obtaining the message indirect after the message is stored, the recipient may receive a message comprised of links to media content, where some or all of the content may be made available via links.

Figure 5:
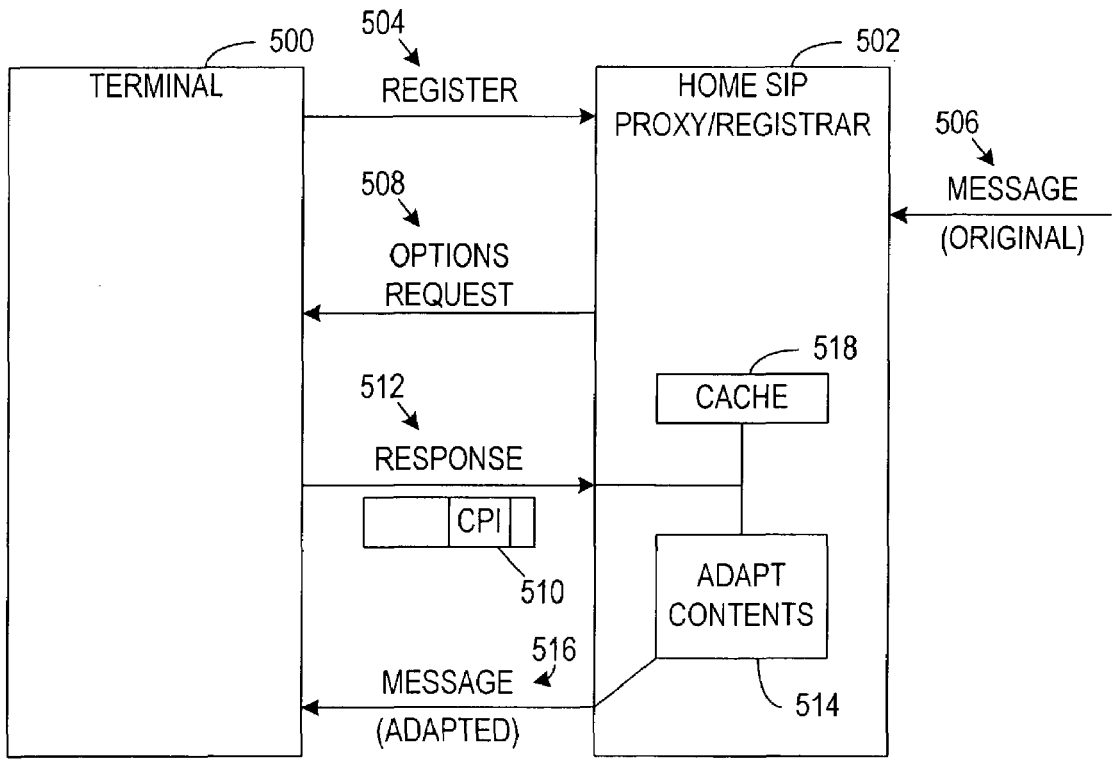
FIG. 5 is a block diagram of an embodiment of a message adaptation framework where the CPI is not part of the registration data during a registration process.

FIG. 5 illustrates an example where the CPI is not part of the registration data during a registration process. In such a case, the CPI can be queried using the OPTIONS method. In this example, the terminal 500 registers to its SIP proxy/registrar 502 using the REGISTER message 504. In this example, no CPI is provided with the registration data, and therefore the SIP registrar 502 may be unaware of any terminal 500 capabilities or user preferences. When the SIP proxy 502 receives a new message 506, it attempts to obtain the CPI from the registrar, but the CPI was not available. This can occur, for example, where the CPI was never received from the terminal 500, or where previously received CPI was not stored at the registrar 502. The proxy 502 sends an OPTIONS request 508 to the recipient's terminal 500, which in turn responds with its CPI 510 in a response 512. The SIP proxy uses the CPI 510 to adapt the message as shown at message adaptation module 514, and sends the adapted message 516 to the terminal 500.

Using the OPTIONS method described in FIG. 5, the proxy 502 may have to query the terminal 500 each time a new message 506 is delivered to the proxy 502. To address this, the CPI 510 can be stored in memory, or preferably cache 518, in order to avoid further requests for the CPI 510 from the terminal 500. It is noted that in a presence application, the OPTIONS method can be used similarly by the presence server to obtain the CPI if not provided during the subscription request.

Figure 6:
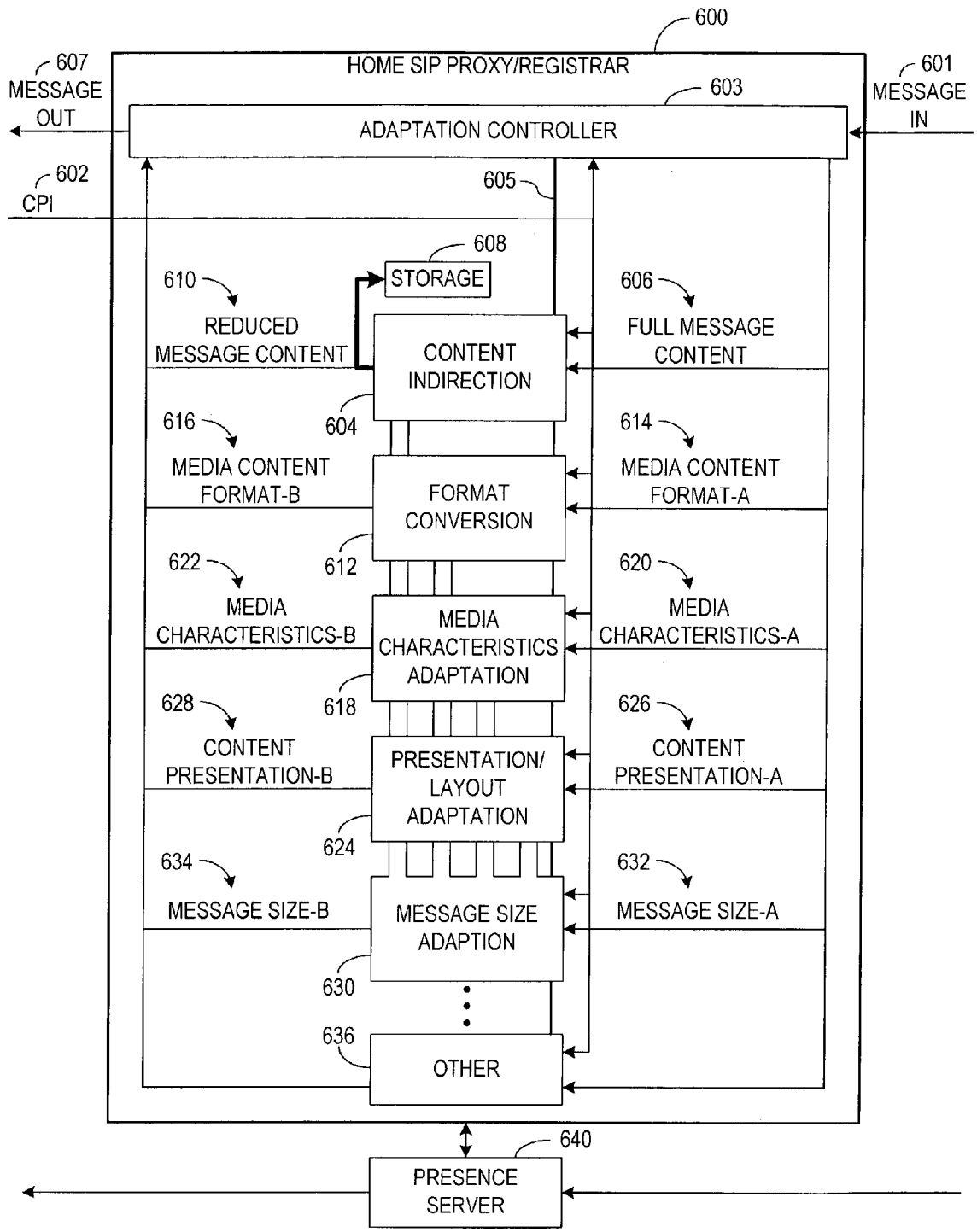
FIG. 6 illustrates various representative message adaptation operations that may be implemented in accordance with the present invention.

Message adaptation may include a variety of different adaptation methods in order to meet the terminal's capabilities and user's preferences. FIG. 6 illustrates various representative message adaptation operations that may be implemented. Each of the various adaptation operations may be performed via hardware, software, or a combination thereof. In one embodiment of the invention, the various operations are performed via software modules operating in connection with standard processing hardware. It is further noted that the adaptation operations illustrated in FIG. 6 are representative examples provided for purposes of facilitating an understanding of various adaptation operations, as the invention is not intended to be limited to the illustrated operations.

For each of the adaptation methods, the SIP proxy/registrar 600 receives the CPI 602 from the terminal (not shown). A message 601 is received at the proxy/registrar 600, which can then be adapted using any one or more adaptation techniques. The adaptation controller 603 represents the controlling mechanism to receive the incoming messages 601, request the appropriate adaptation as depicted by path 605, and output the message 607 as adapted.

The CPI 602 may be provided to the adaptation controller 603 as well as the various adaptation modules, as illustrated in FIG. 6. The adaptation controller 603 may use the CPI 602 to make high-level decisions, such as deciding whether content indirection or adaptation should be utilized, etc. The CPI 602 may be used at any one or more of the adaptation modules (described below) to perform specific adaptation based on the CPI 602.

A first adaptation operation, content indirection 604, was previously described. The content indirection 604 operation involves storing some or all message 606 content portions at the proxy 600 (or another server) as depicted by storage block 608. Reduced message content 610 is then forwarded to the recipient. The reduced message content 610 may include only a URI addressing the content at its storage location at the proxy 600 or other storage server. Alternatively, the reduced message content 610 may include a portion of the content, and a URI(s) for any portions of the content that have been stored. In this manner, the overall message size sent to the terminal can be reduced.

Another adaptation operation is a format conversion 612. This operation converts the message content 614 in a first format(s)-A to another format(s)-B 616. For example, images in Graphics Interchange Format (GIF) could be converted to Joint Photographic Experts Group (JPEG) images if GIF images are not supported by the recipient's terminal. This category includes conversion of layout formats such as eXtensible HyperText Markup Language (XHTML) to Wireless Markup Language (WML), and conversion to modality such as speech to text.

The media characteristics adaptation 618 operation involves any modification of the media characteristics, such that media characteristics-A 620 are converted to media characteristics-B 622. For example, this includes resolution reduction of images for small displays, quality reduction of JPEG images, number of colors in GIF images, modification of audio sampling rates, the number of channels of audio files, etc.

The presentation/layout adaptation 624 operation involves making the content presentation suitable for the recipient's terminal display characteristics, such that content presentation-A 626 is converted to content presentation-B 628. For instance, the best presentation of a message, e.g., how the images are organized on the display, is different for a landscape orientation display compared to a portrait orientation display.

Another adaptation operation is the message size adaptation 630. This adaptation operation receives a first message of size-A 632, and adapts the message to message size-B 634. Thus, the overall message size is reduced by reducing the size of the media parts it contains. One manner of reducing the size is simply to remove some portions of the content from the message. In one embodiment of the invention, message size adaptation may be accomplished using one or more of the other adaptation operations available at the proxy 600. For example, using content indirection 604, the message size is reduced by the amount of content stored at the proxy 600 or other server. Media size reduction can also be achieved through format conversion 612 and/or media characteristics adaptation 618. For example, JPEG images can be reduced in size by reducing their quality factor. This can often be accomplished without significant reduction in the perceived quality. Presentation layout adaptation 624 could also be used to reduce the size of messages, where a particular display orientation requiring fewer bytes than the alternative display orientation is selected, even though not necessarily conforming precisely to the user's display size or providing the entire image. The conditions leading to media size reduction or presentation reduction versus content indirection or deletion may be controlled by the recipient's preferences and terminal capabilities and provided in the CPI. Other 636 adaptation operations may also be provided.

In the presence application, the presence server 640 may or may not have access to the subscriber's terminal capabilities and preferences information. If it does, it may directly create a notification message that is suitable for the subscriber's terminal. Otherwise, it may have to rely on another SIP server, such as SIP proxy 600, to perform message adaptation.

In order to perform the content adaptation described above, capability conveyance of the recipient's terminal capability and characteristics is performed in accordance with the invention. Existing HTTP/SIP protocols do not support providing specific terminal Capability and user's Preference Information (CPI) about prospective recipient terminals. This, however, is very important information, particularly in the case of mobile devices with significantly limited capabilities as compared to their landline counterparts.

More particularly, existing HTTP/SIP protocols do not provide for maximum message body size that the terminal is capable of receiving. This is important because a message exceeding the maximum supported message body size of the terminal may not be able to receive the content at all. Further, even where existing protocols such as SIP provide for some information relating to the terminal, no details are supported relating to the specific terminal limitations of a content type. For instance, a terminal may support an "image/gif" Multipurpose Internet Mail Extensions (MIME) type, but can only accept such an image if the GIF image resolution is lower than 160×120. These more particular terminal details are not currently supported, and many terminals such as mobile terminals simply cannot support any image resolution.

One embodiment of the invention provides the requisite capability descriptors by way of header extensions utilized with existing HTTP, SIP, or analogous protocols. These header extensions are compatible with these existing protocols, and thus provide the requisite terminal CPI in a backward compatible manner. In one embodiment of the invention, additional parameters are introduced to existing MIME types used in HTTP and SIP headers. These additional parameters are used for content adaptation/selection as described in the representative embodiments described above, thus providing adapted messages conforming to the particular terminal to which the message is directed.

In accordance with another embodiment of the invention, new feature tags are provided in the Caller Preferences and Callee Capabilities (CPCC) to provide more detailed information about the CPI. The CPCC represents a set of extensions to SIP which allow a caller to express preferences about request handling in servers. These preferences include the ability to select which URIs a request will be routed to, and to specify certain request handling directives in proxies and redirect servers.

Thus, in two representative embodiments of the invention, new feature tags and MIME header extensions are utilized to support message adaptation in accordance with the present invention. These representative variations for capability exchange allow important characteristics of terminals to be considered in connection with the transfer of content and other data, such as the maximum message body size that can be handled at the terminal, and the maximum resolution that such a terminal can appropriately handle. These representative variations also allow user preferences to be taken into account, such that parameters other than "maximum" values can be identified in accordance with user preferences. Each of these representative embodiments is described more fully below.

Figure 7:
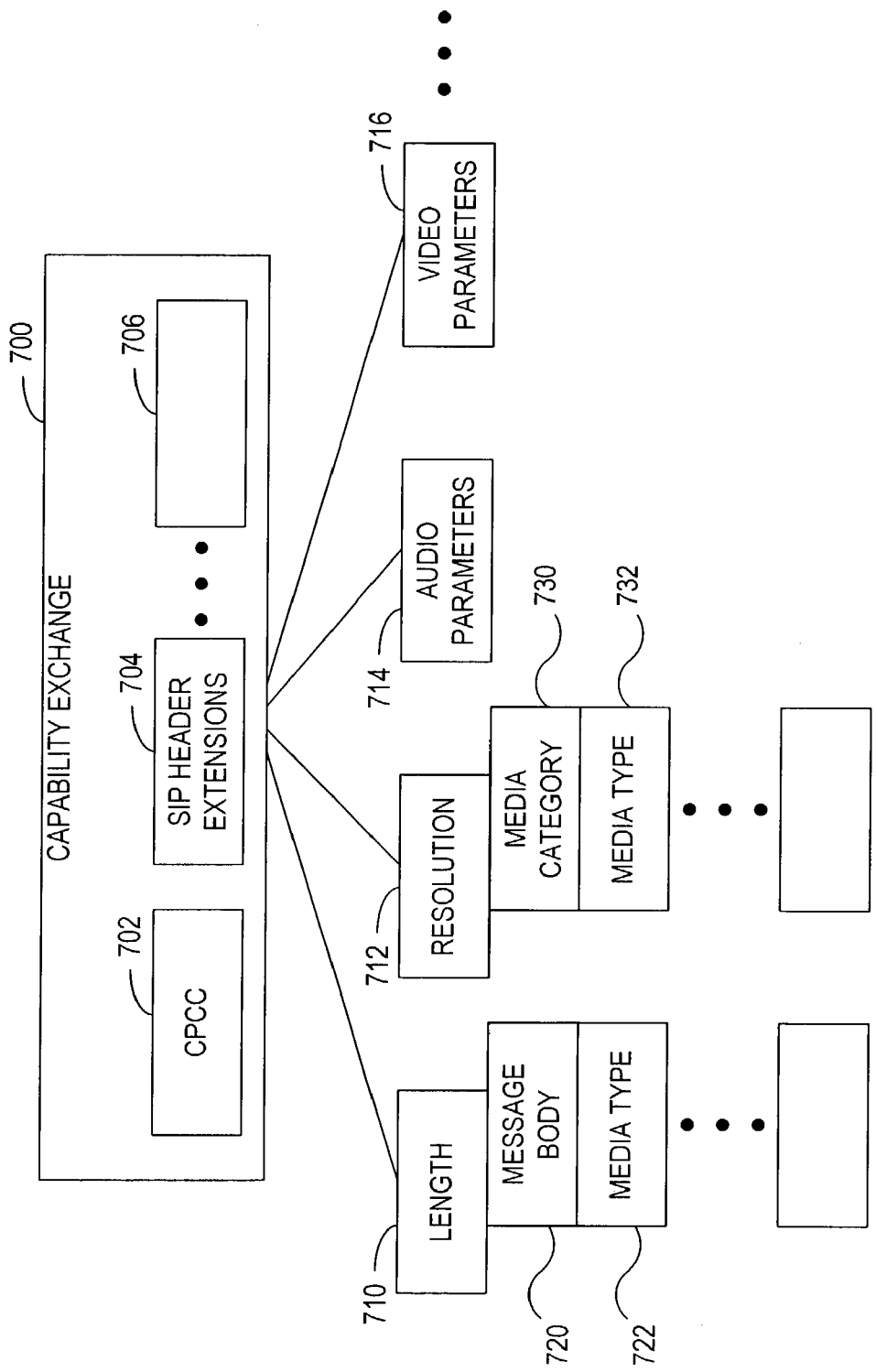
FIG. 7 is a block diagram illustrating various capability exchange techniques in accordance with the present invention.

FIG. 7 is a block diagram illustrating various capability exchange techniques in accordance with the present invention. As indicated above, capability exchange 700 for use in message adaptation in accordance with the present invention may be implemented using, for example, CPCC 702, SIP header extensions 704, or other 706 exchange/conveyance methodology. Each of these capability conveyance techniques may be used to provide detailed terminal capabilities and/or user preferences to the terminal. Representative capability descriptors include length 710 and resolution 712. Length descriptors 710 may include, for example, a message body length 720, and a media type length 722. The message body length 720 corresponds to the length of the message body or message content, and the media type length 722 corresponds to the length of a particular type of media (e.g., JPEG or GIF images limited to a predetermined maximum byte length). Resolution descriptors 712 may include, for example, a resolution for a media category 730 (e.g., all images or video limited by a stated maximum or minimum resolution), and a resolution for particular media types 732 (e.g., JPEG images limited by a stated maximum or minimum resolution).

Other capability descriptors may also be provided using these extensible methodologies, including audio parameters 714 such as the number of channels or sampling rate of audio formats, as well as video parameters 716 such as the frame rate in video formats. Other capability descriptors may also be implemented in accordance with the present invention.

A capability exchange methodology is first considered in the context of Caller Preferences and Callee Capabilities (CPCC). The CPCC is set forth in H. Schulzrinne, J. Rosenberg, "Session Initiation Protocol (SIP) Caller Preferences and Callee Capabilities," Internet Draft draft-ietf-sip-caller-prefs-06.txt, Jul. 1, 2002, which is incorporated herein by reference in its entirety.

In accordance with this embodiment, new "feature tags" are provided in the CPCC to provide more detailed information about the CPI. Once created, the feature tags can be mapped to SIP contact parameters. In one embodiment, this mapping is performed as described in G. Klyne, "A Syntax For Describing Media Feature Sets," RFC 2533, Internet Engineering Task Force, March 1999, which is incorporated herein by reference in its entirety.

Using this methodology, limits may be placed on various characteristics of the terminal. For example, a limit may be placed on the message body size for a terminal, where a representative feature tag is represented as follows in Example 1:

(&(encoding="identity")(length<=32768))

Example 1

This specifies that the maximum message body size cannot exceed 32768 bytes. In prior art systems, such a maximum message body length parameter is not supported. This maximum body size includes, for example, the total size of all the body parts of the message without headers. Thus, a terminal may reserve some memory for the headers since their length may not be precisely known as it may depend on the message transmission (e.g., adding route in SIP).

The terminal message body size limit set forth in Example 1 involves the registration of two media feature tags: 1) encoding; and 2) length. The "encoding" media feature tag corresponds to the Accept-Encoding header of SIP messages. Thus, this information can be mapped to SIP parameters as described in G. Klyne, "A Syntax For Describing Media Feature Sets," RFC 2533, Internet Engineering Task Force, March 1999.

Some MIME "types" may also be limited in size in accordance with the present invention. For example, a length parameter can be associated with a media type as shown in Example 2 below:

(&(type="image/jpeg") (length<=32768); q=0.8

Example 2

This specifies that JPEG images cannot exceed 32768 bytes. It is noted that the "type" media feature tag is already a registered feature tag, and the new "length" feature tag extends the applicability of the "type" media feature tag to identify a maximum length of the particular media type (i.e., a JPEG image in this example).

The field "q=0.8" represents a quality value which are used to rank feature sets according to preference. For example, a quality value of "q=0.8" is preferred over a quality value of "q=0.5." The use of such quality values are particular beneficial where multiple feature tags are used, and relative preference priorities are desired among the multiple feature tags.

In accordance with the present invention, additional media feature tags are provided that relate to the resolutions supported by the terminal for visual media. Two such media feature tags include the "media-pix-x" and "media-pix-y" tags, which provide information about the maximum or minimum horizontal and vertical resolutions respectively. These media feature tags may be applied to a specific MIME type, or to an entire media category. For example, Example 3 sets forth an example where these resolution feature tags are provided for specific MIME types:

(|(&type="image/jpeg") (media-pix-x<=640)(media-pix-y<=480); q=0.9 (&type="image/gif") (media-pix-x<=160) (media-pix-y<=120); q=1

Example 3

These tags specify that the terminal can support JPEG images no larger than 640×480, and GIF images no larger than 160×120. It is noted that the "media-pix-x" and "media-pix-y" feature tags in accordance with the present invention complement existing registered media tags by presenting the maximum resolution handled for different media types.

Example 4 provides an example where the feature tag applies to an entire media category:

(&type="image/*") (media-pix-x<=640) (media-pix-y<=480); q=0.7

Example 4

In this example, the "image/*" indicates that all images are acceptable on the terminal, as long as the images do not exceed 640×480 pixels. However, in typical mobile terminals, it may be more likely that the supported image formats and their specific characteristic restrictions will be listed explicitly.

The quality values may be used to identify capability preferences between multiple supported feature tags, as illustrated in Example 5:

(|(&type="image/gif") (media-pix-x<=640) (media-pix-y<=480); q=0.5 (&type="image/gif") (media-pix-x<160) (media-pix-y<120); q=1

Example 5

These feature tags set forth that GIF images of resolution smaller than 160×120 pixels are preferred, but GIF images of resolution up to and including 640×480 are still supported by the terminal. Such a preference may be expressed, for example, where a terminal has a small display resolution with low memory.

As seen above, a number of feature comparison operators may be used in accordance with the present invention. For example, the operators less than (<), less than or equal to (<=), greater than (>), and greater than or equal to (>=) illustrate representative feature comparison operators that may be used in connection with the present invention to specify more detailed information about length and resolution characteristics of terminals.

The feature tags described above may be identified in any desired format. In one embodiment, these feature tags are provided in a format corresponding to H. Schulzrinne, J. Rosenberg, "Session Initiation Protocol (SIP) Caller Preferences and Callee Capabilities," Internet Draft draft-ietf-sip-callerprefs-06.txt, Jul. 1, 2002, which is based on G. Klyne, "A Syntax For Describing Media Feature Sets," RFC 2533, Internet Engineering Task Force, March 1999.

These feature sets can be mapped to, for example, SIP contact parameters as illustrated in RFC 2533 described above. However, RFC 2533 only maps equality comparisons, such as type="image/gif". In accordance with the present invention, new mapping is provided such that "max+" represents "<=", "max-" represents "<", "min+" represents ">=", and "min-" represents ">". For example, using this mapping technique, the feature tags of Example 5 are mapped to SIP parameters as shown in Example 6 below:

;type="image/gif;q=0.5;media-pix-x=max+640;media-pix-y=max+480, image/gif;q=1;media-pix-x=max−160;media-pix-y=max−120"

Example 6

In accordance with another embodiment of the invention, the CPT can be represented as MIME header extensions of SIP headers. The same mapping for the feature comparison operators (e.g., <, <=, >, >=) that can be used in this case. For purposes of illustration, the same examples used in connection with Examples 1-6 are used to illustrate how these capability descriptors can be represented as SIP header extensions, each of which are illustrated in the examples below.

The capability exchange method using header extensions provides the CPI as MIME header extensions of SIP headers. Using this methodology, limits may be placed on various characteristics of the terminal. For example, a limit may be placed on the message body size for a terminal, where limiting the body size of messages to 32768 bytes would be represented as shown in Example 7 below:

Accept-Encoding: identity;length=max+32768

Example 7

Using the "Accept-Encoding" header field and the "identity" field value, a header extension of "length=max+" can be used to specifically designate a maximum length for the message body. In this example, the body length of the message is set to a maximum value of 32768 bytes.

Media types can also have maximum, minimum, or size ranges associated therewith. For example, to specify that JPEG images (the media type being JPEG) cannot exceed 32768 bytes, the following header field and associated header extensions may be used:

Accept: image/jpeg; q=0.8; length=max+32768

Example 8

Therefore, messages or message components of the JPEG image type must be no greater than 32768 bytes. It is also noted that a quality value of "q=0.8" can also be used to rank multiple header extensions according to preference.

Media types can be required or be preferred to have a minimum or maximum resolution, an acceptable range of resolutions, a specified resolution, etc. For example, it may be specified that the terminal can support JPEG images no larger than 640×480, and GIF images no larger than 160×120. This can be provided using the following header field and associated header extensions:

Accept: image/jpeg; q=0.9; media-pix-x=max+640; media-pix-y=max+480, image/gif;q=1; media-pix-x=max+160; media-pix-y=max+120

Example 9

In this example, the JPEG image has a quality value of 0.9, the "media-pix-x" corresponds to the horizontal resolution and is defined to have a maximum resolution of 640 pixels, and the "media-pix-y" corresponds to the vertical resolution and is defined to have a maximum resolution of 480 pixels. A second media type, a GIF image, has a quality value of 1 (more preferred than the JPEG quality value of 0.9), the "media-pix-x" is defined to have a maximum horizontal resolution of 160 pixels, and the "media-pix-y" is defined to have a maximum vertical resolution of 120 pixels.

Media categories can collectively be specified for a maximum or minimum resolution, range of resolutions, specified resolutions, etc. For example, all media of the media category "image" may be specified collectively, an example of which is shown in Example 10 below:

Accept: image/*;q=0.7; media-pix-x=max+640; media-pix-y=max+480

Example 10

In this example, all content of the media category "image" are acceptable as long as the images do not exceed 640×480 pixels. This is because the "*" symbol replaces any specific image type, and represents all image types.

Example 11 illustrates how the relative preferences between multiple media types can be designated:

Accept: image/gif; q=0.5; media-pix-x=max+640; media-pix-y-max+480, image/gif; q=1; media-pix-x=max−160; media-pix-y-max−120

Example 11

In this example, the media types of GIF images are the same, so the quality values of "q=0.5" and "q=1" are used to determine the relative preference between the designated resolutions for the GIF image media type. Thus, GIF images of resolution less than (e.g., "max−") 160×120 pixels are preferred, but GIF images of resolution up to 640×480 (e.g., "max+") are supported by the terminal.

Rules should be established to account for conflicts. For example, the header entries and associated header extensions shown in Example 12 present a conflict:

Accept: image/*; q=0.7; media-pix-x=max+640; media-pix-y=max+480, image/gif; q=0.7; media-pix-x=max+160; media-pix-y=max+120

Example 12

As seen from Example 11, a "conflict" exists. The "image/*" type indicates that all content of the media category "image" are acceptable as long as the images do not exceed 640×480 pixels. The "image/gif" type indicates that all GIF images must be no greater than a 160×120 resolution. Further, the quality values are equivalent at "q=0.7." Therefore, no discernable preference is indicated, and the "image/*" and "image/gif" types present conflicting capability designations. In such cases, rules can be established to handle these situations. It may be decided that the more specific capability designator will govern over the more general capability designator, or vice-versa. In one embodiment, the more specific case is observed for that case only, and the more general case is observed for the remaining media types. More particularly, the header entries and extensions presented in Example 12 may be interpreted as all images being acceptable as long as they do not exceed 640×480 pixels, except that GIF images must be no greater than 160×120 resolution. Thus, this established "rule" would indicate that the capabilities associated with a more specific type (e.g., image/gif) override the more generic types (e.g., image/*) when the same quality value is used. Another rule, which may be provided as a default rule, is that when a capability header extension is not provided, the assumption is that there is no limitation with respect to this capability.

The header extension examples identified above utilize existing MIME headers, such as "Accept-Encoding" and "Accept" MIME headers. However, in accordance with the present invention, new MIME headers can alternatively be created. For example, a new header of "Accept-Length" can be used to directly provide the message body length, such as: Accept-Length: 32768. In either case, the more specific terminal capabilities can be properly relayed.

FIGS. 8A and 8B illustrate representative examples of capability exchange using the CPCC and header extension methodologies described above. Referring first to FIG. 8A, CPCC techniques are used to provide the CPI. Line 800 specifies that the maximum message body size cannot exceed 32768 bytes. Lines 802A and 802B indicate that JPEG images must not exceed a resolution of 640×480, and must have an overall length less than 16384 bytes. A quality value of 0.9 is assigned. Lines 804A and 804B indicate that GIF images must not exceed a resolution of 160×120, and must have an overall length less than 16384 bytes. A quality value of 0.8 is assigned, indicating that the JPEG format (quality value 0.9) is preferred over GIF.

FIG. 8B illustrates how the same capability information is conveyed using header extensions. Line 810 provides an Accept-Encoding header indicating that the maximum message body size cannot exceed 32768 bytes. Lines 812A and 812B together define the capabilities of two particular media types, including JPEG and GIF images in the illustrated example. More particularly, line 812A provides an Accept header identifying a JPEG image type having a quality value of 0.9 which is preferred over the GIF image type having a quality value of 0.8 shown in line 812B. For the JPEG image type, the header extensions include media-pix-x and media-pix-y values indicating that the resolution of JPEG images cannot exceed 640×480, and the length must be less than 16384 bytes. Similarly for the GIF image type, the header extensions include media-pix-x and media-pix-y values indicating that the resolution of GIF images cannot exceed 160×120, and the length must be less than 16384 bytes. As can be seen, the result is the same as in the case using CPCC for conveying the capability descriptors.

In the case of providing CPI using extended headers, a number of existing SIP headers may be relevant. For example, the "User-Agent" header includes information about the terminal. The "Accept" header provides a list of supported MIME types, to which header extensions may be provided in accordance with the present invention. The "Accept-Encoding" header provides a list of acceptable content coding, and provides a vehicle by which message body size limitations may be designated in accordance with the present invention. The "Accept-Charset" header provides a list of acceptable content character sets in which header extensions in accordance with the present invention can also be used. For instance, consider Example 13:

Accept: text/*; charset=utf-8; charset=iso-latin-15; q=1; length=max+8192

Example 13

In this case, the quality factor parameter may be used to delimit the format-specific parameters from the accept-header-specific parameters. Example 13 indicates that any text format would be accepted using UTF-8 or ISO-8859-15 character sets as long as the text is less than 8192 bytes.

The capability conveyance embodiments described above have been described in terms of media tags and header extensions for purposes of facilitating an understanding of the present invention. However, other mechanisms may also be implemented for providing the capability descriptors within the scope and spirit of the present invention.

Further, the embodiments set forth herein pertaining to capability descriptors included length and resolution descriptors. More particularly, the length capability descriptor allowed for designation of a maximum size of the entity specified, whether the entire message body or any specific MIME type whether images, video, audio, etc. The media-pix-x and media-pix-y capability descriptors provide the horizontal and vertical resolutions respectively of visual media, such as images and video. These descriptors may apply to all images or video, or to specific MIME types. However, other capability descriptors may also be implemented. Such descriptions may include, for example, the number of channels or sampling rate of audio formats, the frame rate in video formats, and the like. Therefore, the embodiments described herein are provided for purposes of illustration, and not of limitation.

Figure 9:
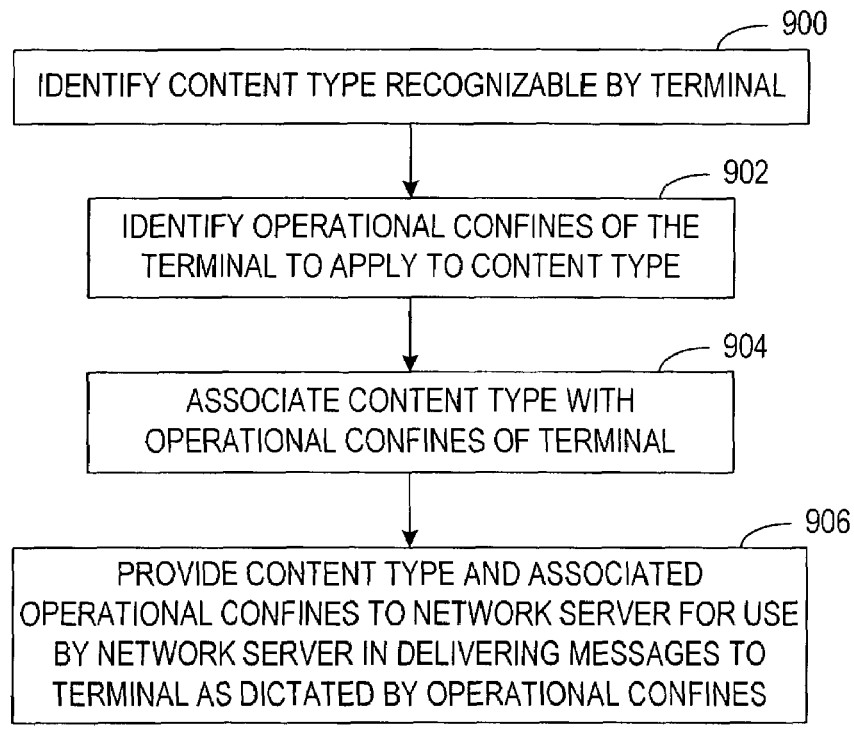
FIG. 9 illustrates a general method for procuring such operational terminal characteristics at a server.

The foregoing description provides illustrative examples of a system and method for procuring operational characteristics of a terminal at a network server, where such operational characteristics can be used by the network server in delivering terminal-compliant messages or other content to the terminal. FIG. 9 illustrates a more general method for procuring such operational terminal characteristics at a server. A content type that is recognizable by the terminal is identified 900. For example, such a content type may correspond to a particular category of content (e.g., image, audio, etc.), or may correspond to all content types such that the content type represents the entire message body. The operational confines of the terminal that are to be applied to the content type are identified 902. For example, where the content type includes a JPEG image, the operational confines may include a maximum (or minimum) size of the JPEG image, the media resolution, etc. The content type and operational confines of the terminal are associated 904 with one another. For example, in the SIP header extension embodiment, this is accomplished by associating the SIP header extension with the header using MIME extensions. The content type and associated operational confines are then provided 906 to the network server for use by the server in delivering messages to the terminal as dictated by the operational confines.

Figure 10:
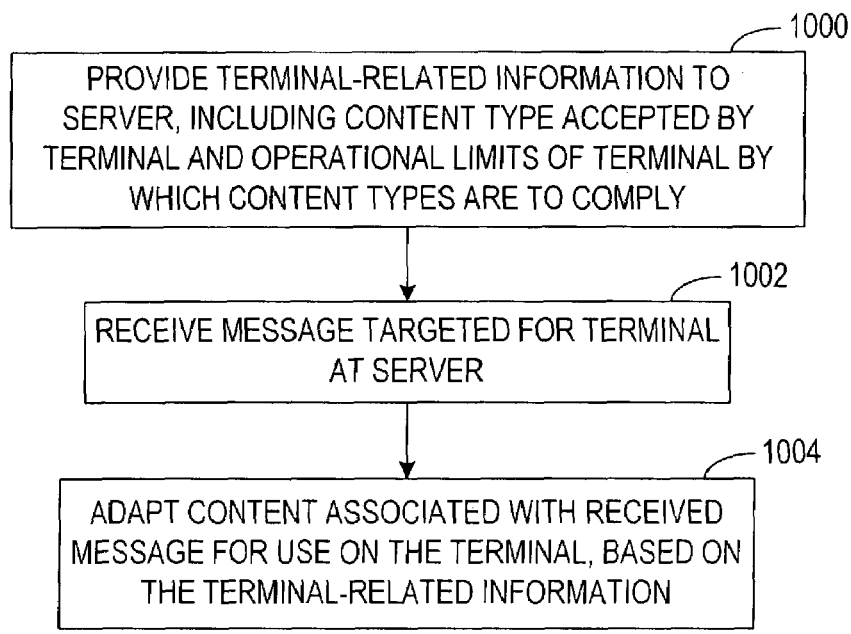
FIG. 10 illustrates a general method for preparing message content for use on a terminal.

The foregoing description also provides illustrative examples of a system and method for preparing message content for use on a terminal. FIG. 10 illustrates a more general method for preparing such content. Terminal-related information, including the content type accepted by the terminal and the operational limits of the terminal by which the content types are to comply, are provided 1000 to the server. Messages targeted for the terminal are received 1002 at the server, such as Instant Messaging (IM) messages. The content associated with the received message is adapted 1004 for use on the terminal, based on the terminal-related information previously provided.

The terminal capability conveyance solution in accordance with the present invention provides CPI in various manners, including in the headers of SIP messages, or as Caller Preferences and Callee Capabilities (CPCC) during registration (e.g., REGISTER method) or subscription (e.g., SUBSCRIBE method). The solution is straightforward, extensible, and backward compatible. The solution provides a way to provide detailed capability information that is not supported in prior art solutions, so that adaptation of content can occur at a level commensurate with the specific capabilities of particular mobile and landline communication terminals.

Servers, such as registrars and presence servers, are then responsible for extracting the relevant CPI and storing it. The CPI can then be used for message adaptation in accordance with the present invention.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art are readily able to combine software created as described with appropriate general purpose or special purpose computer hardware to create a message adaptation system and/or computer subcomponents embodying the invention and/or for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising:
   specifying, via a particular terminal, at least one content type acceptable by the particular terminal for non-session based messaging via an accept-type header field of a registration or subscription message associated with establishing terminal sessions;
   specifying, via the particular terminal, rules pertaining to the content type via an extension to the accept-type header field of a session initiation protocol message, wherein the rules establish terminal-specific conditions in which the content type will be accepted at the particular terminal;
   including the rules pertaining to the content type in the registration or subscription message; and
   sending the registration or subscription message from the particular terminal to a session initiation protocol presence server via a session initiation protocol proxy sewer for storage and subsequent use by at least the presence server in formatting and delivering the terminal-compliant, non-session-based messages addressed to the particular terminal from a source terminal as mandated by the rules, wherein the non-session-based messages comprise presence notifications that communicate changes in one or more of communications means, communications address, and status of a user.

2. The method of claim 1, wherein the accept-type header field comprises an Accept header field.

3. The method of claim 1, wherein the content type comprises a message coding type and the accept-type header field comprises an Accept-encoding header field.

4. The method of claim 3, wherein the rules comprise an acceptable message body length for messages delivered to the terminal.

5. The method of claim 1, wherein specifying the at least one content type comprises specifying any one or more of an image type, video type, text type, audio type.

6. The method of claim 5, wherein specifying rules pertaining to the content type comprises specifying at least a data size constraint by which the content type is to comply.

7. The method of claim 6, wherein specifying the data size constraint comprises specifying at least one of a minimum, maximum, range, or specified data size by which the content type is to comply.

8. The method of claim 6, wherein specifying the data size constraint comprises specifying at least a media resolution constraint by which the content type is to comply.

9. The method of claim 1, wherein:
   specifying the at least one content type comprises specifying a plurality of image types; and
   wherein specifying rules pertaining to the content type comprises specifying at least one of a data size constraint and a media resolution constraint for which each of the plurality of image types is to comply.

10. The method of claim 1, wherein specifying the at least one content type comprises specifying a text type, and wherein specifying operational confines of the terminal comprises specifying one or more of a number of character sets by which the text type is to comply.

11. A method comprising:
    specifying, via a particular terminal, at least one content type acceptable by the particular terminal for non-session based messaging using Caller Preferences and Callee Capabilities (CPCC) in connection with a registration or subscription message associated with establishing terminal sessions;
    specifying, via the particular terminal, rules pertaining to the content type via media feature tags of a session initiation protocol message, wherein the rules establish terminal-specific conditions in which the content type will be accepted at the particular terminal; including the rules pertaining to the content type in the registration or subscription message; and
    sending the registration or subscription message, with the rules expressed by way of the CPCC, from the particular terminal to a session initiation protocol presence server via a session initiation protocol proxy server for storage and subsequent use by at least the presence server in formatting and delivering the terminal-compliant, non-session-based messages addressed to the particular terminal from a source terminal as mandated by the rules, wherein the non-session-based messages comprise presence notifications that communicate changes in one or more of communications means, communications address, and status of a user.

12. The method of claim 11, wherein specifying the at least one content type comprises specifying any one or more of an image type, video type, text type, audio type.

13. The method of claim 12, wherein specifying rules pertaining to the content type comprises specifying at least a data size constraint by which the content type is to comply.

14. The method of claim 11, wherein:
    specifying the at least one content type comprises specifying a plurality of image types; and wherein specifying rules pertaining to the content type comprises specifying at least one of a data size constraint and a media resolution constraint for which each of the plurality of image types is to comply.

15. The method of claim 11, wherein specifying the at least one content type comprises specifying a text type, and wherein specifying operational confines of the terminal comprises specifying one or more of a number of character sets by which the text type is to comply.

16. An apparatus comprising:
an interface capable of wirelessly communicating via a network; and
processing hardware coupled to the interface, wherein the processing hardware causes the apparatus to:
specify at least one content type acceptable by a particular terminal for non-session based messaging via an accept-type header field of a registration or subscription message associated with establishing terminal sessions;
specify rules pertaining to the content type via an extension to the accept-type header field of a session initiation protocol message, wherein the rules establish terminal-specific conditions in which the content type will be accepted at the particular terminal;
include the rules pertaining to the content type in the registration or subscription message; and
send the registration or subscription message from the particular terminal to a session initiation protocol presence server via a session initiation protocol proxy server for storage and subsequent use by at least the presence server in formatting and delivering the terminal-compliant, non-session-based messages addressed to the particular terminal from a source terminal as mandated by the rules, wherein the non-session-based messages comprise presence notifications that communicate changes in one or more of communications means, communications address, and status of a user.

17. The apparatus of claim 16, wherein the accept-type header field comprises an Accept header field.

18. The apparatus of claim 16, wherein the content type comprises a message coding type and the accept-type header field comprises an Accept-encoding header field.

19. The apparatus of claim 16, wherein the rules comprise an acceptable message body length for messages delivered to the terminal.

20. The apparatus of claim 16, wherein specifying the at least on 8e content type comprises specifying any one or more of an image type, video type, text type, audio type.

21. The apparatus of claim 20, wherein specifying rules pertaining to the content type comprises specifying at least a data size constraint by which the content type is to comply.

22. The apparatus of claim 21, wherein specifying the data size constraint comprises specifying at least one of a minimum, maximum, range, or specified data size by which the content type is to comply.

23. The apparatus of claim 21, wherein specifying the data size constraint comprises specifying at least a media resolution constraint by which the content type is to comply.

24. The apparatus of claim 16, wherein:
specifying the at least one content type comprises specifying a plurality of image types; and
wherein specifying rules pertaining to the content type comprises specifying at least one of a data size constraint and a media resolution constraint for which each of the plurality of image types is to comply.

25. A computer usable storage medium having instructions stored thereon executable by an apparatus for performing:
specifying, via a particular terminal, at least one content type acceptable by the particular terminal for non-session based messaging via an accept-type header field of a registration or subscription message associated with establishing terminal sessions;
specifying, via the particular terminal, rules pertaining to the content type via an extension to the accept-type header field of a session initiation protocol message, wherein the rules establish terminal-specific conditions in which the content type will be accepted at the particular terminal;
including the rules pertaining to the content type in the registration or subscription message and
sending the registration or subscription message from the particular terminal to a session initiation protocol presence server via a session initiation protocol proxy server for storage and subsequent use by at least the presence server in formatting and delivering the terminal-compliant, non-session-based messages addressed to the particular terminal from a source terminal as mandated by the rules, wherein the non-session-based messages comprise presence notifications that communicate changes in one or more of communications means, communications address, and status of a user.

26. The computer usable storage medium of claim 25, wherein the accept-type header field comprises an Accept header field of a Session Initiation Protocol (SIP) message, and wherein sending the registration or subscription message comprises transmitting the message via SIP.

27. The computer usable storage medium of claim 25, wherein the content type comprises a message coding type and the accept-type header field comprises an Accept-encoding header field of a Session Initiation Protocol (SIP) message, and wherein sending the registration or subscription message comprises transmitting the message via SIP.

28. The computer usable storage medium of claim 25, wherein the rules comprise an acceptable message body length for messages delivered to the terminal.

29. The computer usable storage medium of claim 25, wherein specifying the at least one content type comprises specifying any one or more of an image type, video type, text type, audio type.

30. The computer usable storage medium of claim 29, wherein specifying rules pertaining to the content type comprises specifying at least a data size constraint by which the content type is to comply.

31. The computer usable storage medium of claim 30, wherein specifying the data size constraint comprises specifying at least one of a minimum, maximum, range, or specified data size by which the content type is to comply.

32. The computer usable storage medium of claim 30, wherein specifying the data size constraint comprises specifying at least a media resolution constraint by which the content type is to comply.

* * * * *

UNITED STATES PATENT AND TRADEMARK OFFICE
CERTIFICATE OF CORRECTION

| | | |
|---|---|---|
| PATENT NO. | : 7,685,315 B2 | Page 1 of 1 |
| APPLICATION NO. | : 10/281872 | |
| DATED | : March 23, 2010 | |
| INVENTOR(S) | : Pekka Pessi et al. | |

It is certified that error appears in the above-identified patent and that said Letters Patent is hereby corrected as shown below:

In the Claims

Column 19, line 57: "sewer" should be --server--.

Column 21, line 48: "on 8$e$" should be --one--.

Signed and Sealed this

Fifteenth Day of June, 2010

David J. Kappos
*Director of the United States Patent and Trademark Office*